United States Patent
Norberg et al.

(10) Patent No.: US 10,808,815 B2
(45) Date of Patent: Oct. 20, 2020

(54) SHIFT CONTROL ARRANGEMENT IN A GEARBOX

(71) Applicant: SCANIA CV AB, Södertälje (SE)

(72) Inventors: Peer Norberg, Södertälje (SE); Per Arnelöf, Vendelsö (SE)

(73) Assignee: Scania CV AB, Södertälje (SE)

( * ) Notice: Subject to any disclaimer, the term of this patent is extended or adjusted under 35 U.S.C. 154(b) by 213 days.

(21) Appl. No.: 16/083,835

(22) PCT Filed: Mar. 16, 2017

(86) PCT No.: PCT/SE2017/050257
§ 371 (c)(1),
(2) Date: Sep. 10, 2018

(87) PCT Pub. No.: WO2017/160219
PCT Pub. Date: Sep. 21, 2017

(65) Prior Publication Data
US 2019/0085960 A1    Mar. 21, 2019

(30) Foreign Application Priority Data
Mar. 17, 2016 (SE) ........................... 1650360

(51) Int. Cl.
*F16H 37/04* (2006.01)
*F16H 63/36* (2006.01)
(Continued)

(52) U.S. Cl.
CPC ......... *F16H 37/046* (2013.01); *F16H 37/042* (2013.01); *F16H 57/023* (2013.01);
(Continued)

(58) Field of Classification Search
CPC .............................. F16H 37/046; F16H 63/30
See application file for complete search history.

(56) References Cited

U.S. PATENT DOCUMENTS

| 3,354,741 A | 11/1967 | Johnston, Jr. et al. |
| 3,747,425 A | 7/1973 | MacDonald |

(Continued)

FOREIGN PATENT DOCUMENTS

| CH | 247583 A | 3/1947 |
| JP | 53090781 A | 8/1978 |

OTHER PUBLICATIONS

Scania CV AB, International Application No. PCT/SE2017/050257, International Preliminary Report on Patentability, dated Sep. 18, 2018.

(Continued)

*Primary Examiner* — Terence Boes
(74) *Attorney, Agent, or Firm* — Moore & Van Allen PLLC; W. Kevin Ransom

(57) ABSTRACT

Provided is a shift control arrangement in a gearbox, comprising a first shift rod with a first end part connectable to a first power means and second end part connected to a first shift fork; a second shift rod with first end part connectable to a second power means and second end part connected to a second shift fork; a first set of grooves in the first shift rod, a second groove in the second shift rod; and a lock pin between the first and second shift rods, which lock pin, with the first set of grooves and the second groove restrict and/or allow axial movement of the respective first and second shift rods. The first end part of the first shift rod is provided with an axial directed cut out for non-conflicting with the lock pin, and the first end part of the second shift rod is provided with a control surface for axial movement of the lock pin.

20 Claims, 6 Drawing Sheets

(51) Int. Cl.
  *F16H 57/023* (2012.01)
  *F16H 63/30* (2006.01)
  *F16H 63/00* (2006.01)
(52) U.S. Cl.
  CPC ......... *F16H 63/30* (2013.01); *F16H 63/3013* (2013.01); *F16H 63/36* (2013.01); *F16H 2063/005* (2013.01); *F16H 2063/3079* (2013.01)

(56) References Cited

U.S. PATENT DOCUMENTS

| | | | |
|---|---|---|---|
| 4,016,773 A | | 4/1977 | Galas et al. |
| 4,120,212 A | | 10/1978 | Philipsen |
| 5,549,020 A | * | 8/1996 | Gundrum ................ F16H 63/30 |
| | | | 403/343 |
| 6,196,944 B1 | | 3/2001 | Schmitz |
| 6,296,070 B1 | | 10/2001 | Yamada |
| 2004/0007084 A1 | * | 1/2004 | Lanz ...................... F16H 63/30 |
| | | | 74/335 |
| 2009/0241717 A1 | * | 10/2009 | Matsumoto ............. F16H 63/30 |
| | | | 74/473.36 |
| 2010/0071492 A1 | * | 3/2010 | Matsumoto ............. F16H 3/083 |
| | | | 74/337.5 |
| 2012/0115677 A1 | * | 5/2012 | Sakai ....................... B60K 6/48 |
| | | | 477/5 |
| 2015/0081180 A1 | * | 3/2015 | Hertlein ................ F16H 61/702 |
| | | | 701/51 |
| 2020/0166134 A1 | * | 5/2020 | Norberg ................. F16H 63/36 |

OTHER PUBLICATIONS

Scania CV AB, Korean Application No. 10-2018-7027439, Office Action, dated Oct. 21, 2019.
Scania CV AB, European Application No. 17767072.6, Extended European Search Report, dated Sep. 30, 2019.
International Search Report for International Application No. PCT/SE2017/050257 dated May 17, 2017.
Written Opinion of the International Searching Authority for International Application No. PCT/SE2017/050257 dated May 17, 2017.

\* cited by examiner

SHIFT CONTROL ARRANGEMENT IN A GEARBOX

CROSS-REFERENCE TO RELATED APPLICATION(S)

This application is a national stage application (filed under 35 § U.S.C. 371) of PCT/SE2017/050257, filed Mar. 16, 2017 of the same title, which, in turn claims priority to Swedish Application No. 1650360-9, filed Mar. 17, 2016 of the same title; the contents of each of which are hereby incorporated by reference.

FIELD OF THE INVENTION

The invention relates to a shift control arrangement in a gearbox for vehicles, a gearbox comprising such a shift control arrangement and a vehicle comprising such a gearbox, according to the appended claims.

BACKGROUND OF THE INVENTION

In vehicles, and especially for heavier vehicles such as trucks, a range gearbox device is often connected to a main gearbox device to double the number of gears. Such an auxiliary gearbox device usually includes a planetary gear, which has a low gear and a high gear, wherein the shift facilities of the main gearbox device can be divided into a low range gear position and a high range gear position. In low range gear a downshift takes place through the planetary gear, and in the high range gear the gear ratio is 1:1 in the planetary gear.

The range gearbox device is usually provided between the main gearbox device and a propeller shaft coupled to the drive wheels of the vehicle. The main gearbox device is accommodated in a main gearbox housing and the range gearbox device is accommodated in a range gearbox housing. The range gearbox device comprises an input shaft coupled to the main gearbox device, an output shaft and between the input shaft and the output shaft the planetary gear is disposed. The planetary gear usually comprises three components, which are rotatable arranged relative to each other namely a sun gear wheel, a planet carrier with planet gear wheels and a ring gear wheel. With knowledge of the number of teeth of the sun gear wheel and the ring gear wheel the relative speed of the three components can be determined during operation. In a range gearbox device the sun gear wheel can be rotatable connected to the input shaft, a number of planet gear wheels which engage said sun gear wheel, which planet gear wheels are rotatable mounted on the planet carrier which is fixedly connected to the output shaft, and the ring gear wheel which surrounds and engages the planet gear wheels.

In a known range gearbox device the low range gear position and high range gear position are obtained by displacing an axially displaceable sleeve between the low range gear position, in which the ring gear is rotationally locked relative to the range gearbox housing, and high range gear position in which the ring gear wheel is rotatable relative to the range gearbox housing and where the ring gear wheel, the planet gear wheels and the sun gear wheel rotate as a common unity.

The axially displaceable coupling sleeve is provided with splines and by controlling the transmission to synchronous speed between the two components to be connected an axial displacement of the coupling sleeve along the two components is made possible in order to connect them. When the components should be detached the transmission is controlled so that torque balance occurs between the components so that the coupling sleeve is not transmitting torque. It then becomes possible to move the coupling sleeve along the components in order to disengage them from each other.

The document U.S. Pat. No. 6,196,944 shows a planetary gear comprising a sun gear, a planet carrier with planet gears and a ring gear. The sun gear may be connected to the input shaft by means of a coupling sleeve in a low range gear position and disengaged from the input shaft in a high range gear position. In the high range gear position the input shaft is connected to of the planet carrier by means of the same coupling sleeve. The ring gear is firmly connected to a gearbox housing. The known planetary gear is arranged in an auxiliary gearbox, having only two gear positions.

The reverse gear in a transmission in a vehicle is often arranged in the main gearbox, which then comprises a gear which is engaged when the vehicle is to be driven in the reversed direction. The gear wheel, which is intended for the reverse gear, causes an elongation of the main gearbox device, and an undesired increase in weight of the vehicle. The reverse gear wheel rotates in the opposite direction to the other gears in the main gearbox device, which causes losses. Said gear wheel which is intended for the reverse gear has a tendency to produce undesirable noise in the transmission, which is a result of an intermediate gear wheel disposed between a lay shaft and a main shaft in the main gearbox device.

Therefore, it is preferable to replace the reverse gear in the main gearbox device by means of a reverse gear arranged in the range gearbox device. The reverse gear arranged in the range gearbox device is shifted by means a second axially displaceable sleeve. When the range gearbox device is shifted into the reverse gear, the second axially displaceable sleeve connects the ring gear wheel with the propeller shaft at the same time as the first axially displaceable sleeve connects the planet carrier with the range gearbox housing.

The U.S. Pat. No. 6,196,944 shows a gearbox for motor vehicles comprising a planetary gear comprising a first and a second sleeve acting on the planet carrier, the ring gear, the gearbox housing and the output shaft. The first and second sleeves are controlled as one connected unit.

The axial displacement of the first and second coupling sleeves are provided with a first and second shift fork arranged in an outside circumferential groove in the respective coupling sleeve. The shift forks are influenced by a first and second power means, which may be a pneumatic or hydraulic cylinder. Shift rods connected to the power means and the shift forks transfer the axial movement from the power means to the shift forks. When assembling and disassembling the range gearbox device to and from the main gearbox device the shift rods are preferably connected to and disconnected from the power means.

In order to prevent damage in the range gearbox device due to selecting an impropriate gear when shifting gears in the range gearbox device the shift control arrangement for the range gearbox device is provided with a shift interlock. Such an impropriate selection of gears may be the selection of the low range gear when the range gearbox device is shifted into the reverse gear. In this case both gear wheels and the coupling sleeves could be damaged.

A known shift interlock for a transmission is disclosed in document U.S. Pat. No. 4,120,212. The shift interlock comprises a pair of lock pins, which are disposed in lock pin bores arranged in a housing. The lock pins are designed to engage annular grooves in a pair of shift rods, which are restricted to move axially when the lock pin engages the annular groove. Thus, an improper gear when shifting gears can be avoided. However, when assembling this known shift interlock, one of the shift rods must be assembled before the other shift rod.

Known transmissions often requires complete disassembly of the gearbox for replacement of the range gearbox device, which means that it takes much time and it becomes costly to repair the range gearbox device. Also, when the vehicle is assembled at the construction plant it takes much time to assemble the range gearbox device due to the shift interlock in the shift control arrangement.

SUMMARY OF THE INVENTION

There is a need to further develop a shift control arrangement in a gearbox in which make it easy to assemble and disassemble the gearbox in a vehicle. There is also a need to develop a shift control arrangement in a gearbox that is easy to repair. Also, there is a need to develop a shift control arrangement in a gearbox which save manufacturing and maintenance costs.

The object of the present invention is therefore to develop a shift control arrangement in a gearbox in which make it easy to assemble and disassemble the gearbox in a vehicle.

Another object of the present invention is to develop a shift control arrangement in a gearbox that is easy to repair.

A further object of the invention is to develop a shift control arrangement in a gearbox which save manufacturing and maintenance costs.

The herein mentioned objects are achieved by the above-mentioned shift control arrangement in a gearbox according to the independent claims.

According to the invention the shift control arrangement in a gearbox comprises a first shift rod, provided with a first and second end part, which first end part is connectable to a first power means and the second end part is connected to a first shift fork; a second shift rod, provided with a first and second end part, which first end part is connectable to a second power means and the second end part is connected to a second shift fork, a first set of grooves arranged in the first shift rod, a second groove arranged in the second shift rod, and a lock pin arranged between the first and second shift rod, which lock pin together with the first set of grooves and the second groove are arranged to restrict or allow axial movement of the respective first and second shift rod. The first end part of the first shift rod is provided with an axial directed cut out for non-conflicting with the lock pin, and in that the first end part of the second shift rod is provided with a control surface for axial movement of the lock pin.

Such a shift control arrangement in a gearbox makes it easy to assemble and disassemble the gearbox in a vehicle, because the shift rods may be assembled to the power means after a main gearbox device first has been mounted to the vehicle. Also, such a shift control arrangement makes the gearbox easy to repair, because only parts of the gearbox, such a range gearbox device, can be disassembled instead of removing the complete gearbox from the vehicle. Thus, such shift control arrangement will save manufacturing and maintenance costs of the vehicle and the gearbox. When moving the shifting rods in an axial direction during assembling and disassembling, the gearbox the lock pin will allow this movement due to the control surface and the axial directed cut out.

According to one embodiment of the invention the axial directed cut out of the first end part of the first shift rod is essentially flat. This makes it possible to move the first shift rod axially and past the lock pin when assembling and disassembling the gearbox in the vehicle.

According to a further embodiment of the invention the axial directed cut out of the first end part of the first shift rod has a shape in a cross section to a central axis that is complementary to the shape of the lock pin. Thus, the lock pin will allow the first shift rod to move axially when the lock pin is arranged into the axial directed cut out.

According to a further embodiment of the invention, the lock pin has a pointed shape in both ends. Such a pointed shape of the ends of the lock pin will make it possible for the shift rods to move the lock pin axially when shifting gears in the gearbox.

According to a further embodiment of the invention a normal to the control surface of the first end part of the second shift rod has an angle between 10°-80°, and preferably between 30°-60°, in relation to a central axis of the second shift rod. Such a control surface will move the lock pin axially when the second shift rod is moved axially and the control surface is in contact with the lock pin.

According to a further embodiment of the invention the first end part of the first shift rod is connectable to the first power means by means of a first coupling element; and in that the first end part of the second shift rod is connectable to the second power means by means of a second coupling element. Such first and second coupling elements make it possible to connect and remove the shifting rods from the power means when assembling and disassembling the gearbox in the vehicle.

According to a further embodiment of the invention the lock pin is arranged at a main gearbox housing, which at least partly surrounds the main gearbox device. When arranging the lock pin at the main gearbox housing, the axial extension of a range gearbox device arranged on the main gearbox device can be reduced. The range gearbox device can therefore be designed with a short axial extension which reduces the weight of the range gearbox device. Thus, assembling and disassembling the gearbox in the vehicle will be easy.

According to a further embodiment of the invention, the first and second shift forks are arranged in a range gearbox device, which is connectable to the main gearbox device. Thus, the shift control arrangement is arranged to control the gear shifting in the range gearbox device.

According to a further embodiment of the invention the first set of grooves together with the lock pin are arranged to prevent the first shift rod from moving axially and to allow the second shift rod to move axially; and in that the second groove together with the lock pin is arranged to prevent the second shift rod from moving axially and to allow the first shift rod to move axially. When the lock pin is arranged within a groove in the first set of grooves the second shift rod is allowed to move axially and the first shift rod is restricted to move. When the lock pin is arranged within the second groove the first shift rod is allowed to move axially and the second shift rod is restricted to move.

A reverse gear in the power train is achieved when a first axially movable coupling sleeve is arranged to engage a planet carrier with the range gearbox housing and a second axially movable coupling sleeve is arranged to engage a ring gear with an output shaft. The reverse gear can be easily shifted to by controlling the first and second axially displaceable coupling sleeves. However, a malfunction in a control system of the gearbox may unintentional be activating the power means and move one of the first and second axially displaceable coupling sleeves. Thus, if the gearbox is unintentional shifted into the reverse gear when the vehicle is moving forward it may cause damage to the gearbox. The shift control arrangement in a gearbox is arranged to avoid such an incident.

Further advantages of the invention appear from the following detailed description.

BRIEF DESCRIPTION OF THE DRAWINGS

Below is a description of, as examples, preferred embodiments of the invention with reference to the enclosed drawings, in which:

FIGS. 5a-6b show schematically different embodiments of a cross section trough line I-I of a shift rod in FIG. 4a.

DETAILED DESCRIPTION OF THE INVENTION

Figure 1:
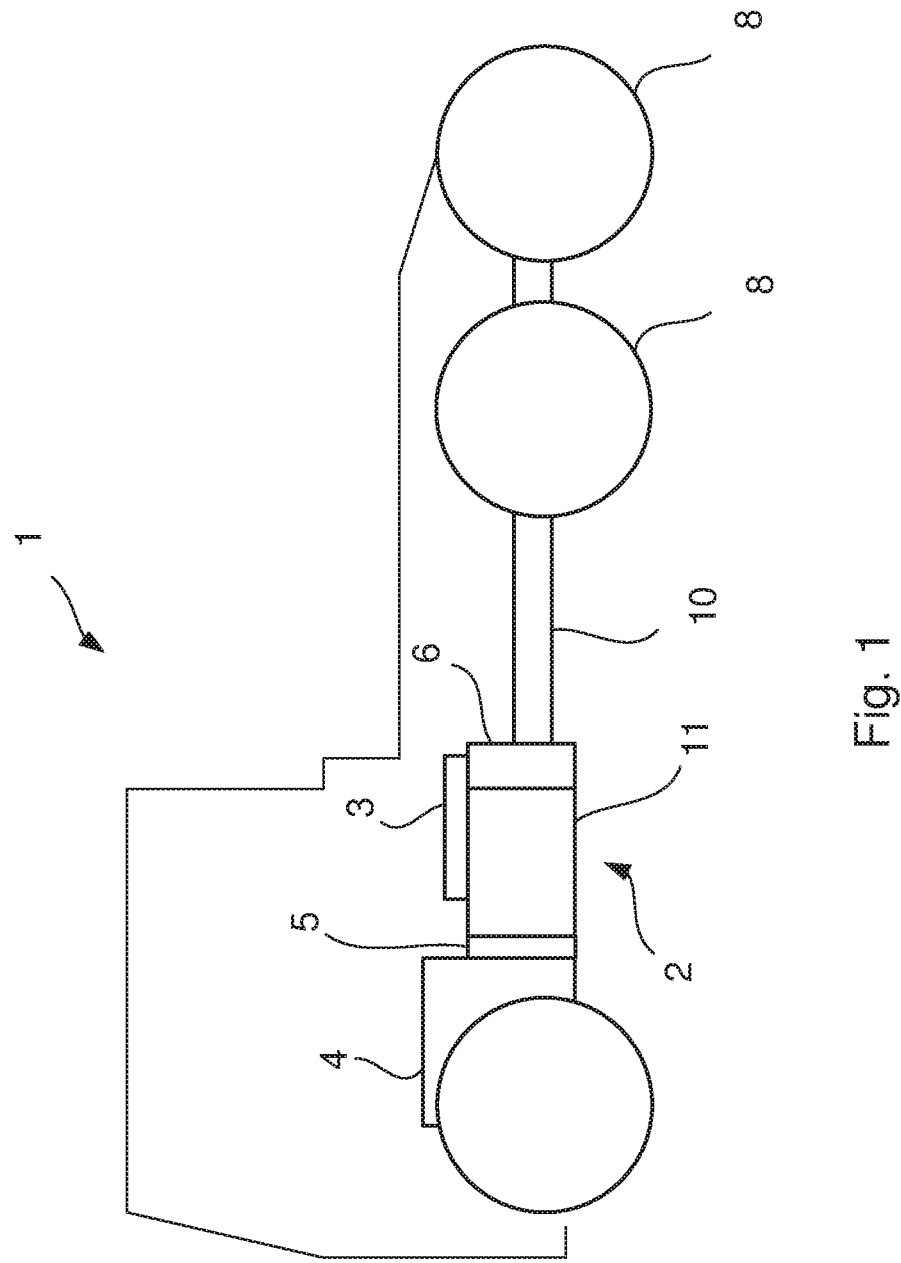
FIG. 1 shows schematically a vehicle in a side view with a gearbox having a shift control arrangement according to the invention.

FIG. 1 shows schematically a vehicle 1 in a side view with a gearbox 2 provided with a shift control arrangement 3 according to the invention. The vehicle 1 is also provided with an internal combustion engine 4, a clutch 5, a propeller shaft 10 and drive wheels 8. The combustion engine 4 is coupled to the gearbox 2 via the clutch 5. The gearbox 2 comprises a main gearbox device 11 and a range gearbox device 6. The main gearbox device 11 is surrounded by a main gearbox housing 12 and the range gearbox device 6 is surrounded by a range gearbox housing 13. The gearbox 2 is connected to the drive wheels 8 of the vehicle 1 via the propeller shaft 10.

Figure 2:
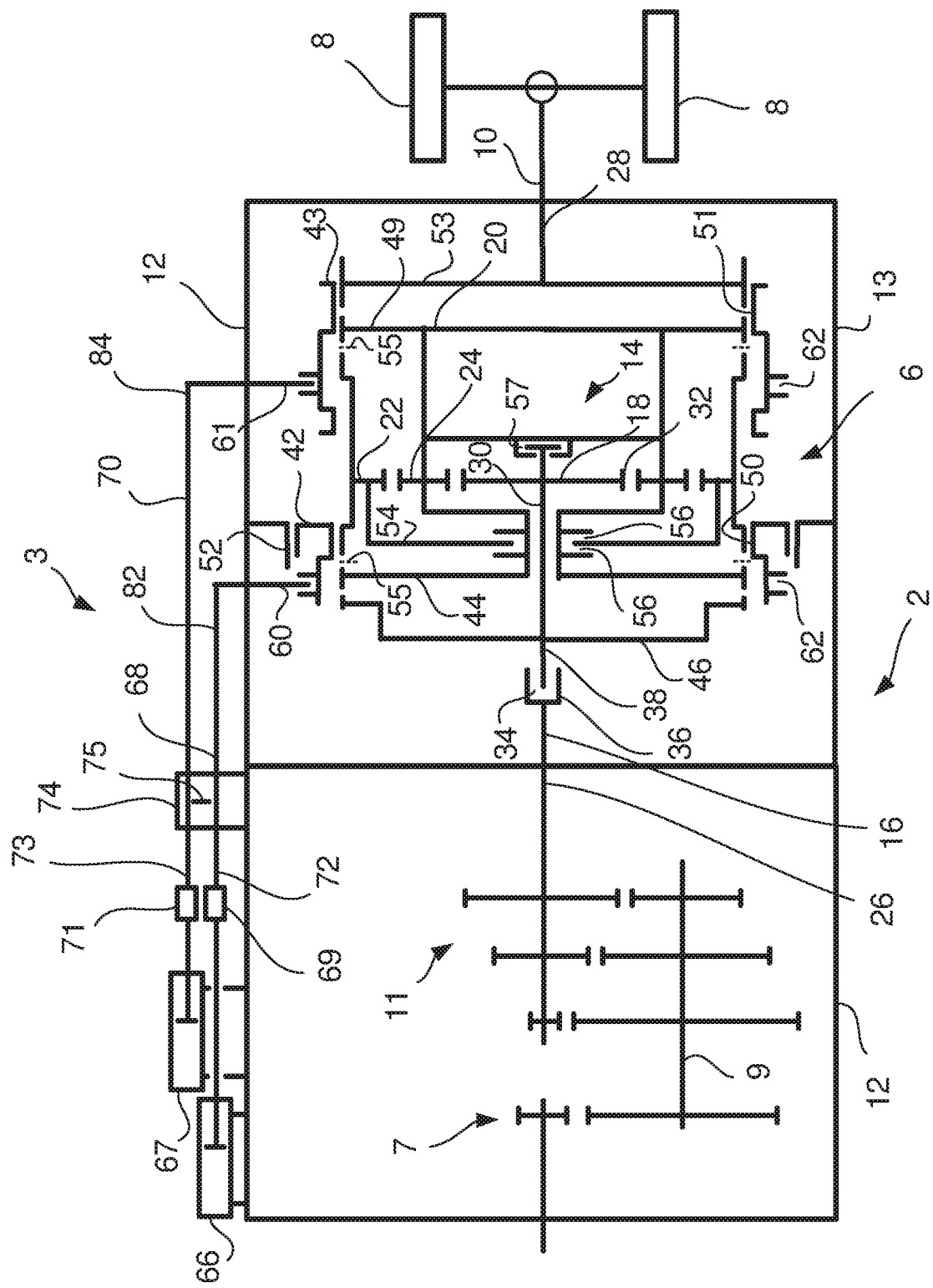
FIG. 2 shows schematically a cross section of the gearbox provided with a shift control arrangement according to the invention.

FIG. 2 shows a schematic sectional view of a gearbox 2 having a shift control arrangement 3 according to the invention. The range gearbox device 6 comprises a planetary gear 14 which has a low and a high gear, so that the shifting capability of the gearbox 2 can be divided into a low range gear position and a high range gear position. In a first gear position corresponding to the low range gear position a downshift takes place in the planetary gear 14. In the high range gear position the gear ratio is 1:1 in the planetary gear 14. FIG. 2 shows the range gearbox device 6 in the first gear position, corresponding to the low range gear position.

The gearbox 2 also comprises a split gearbox device 7 and a lay shaft 9. The main gearbox device 11 is provided with a main shaft 26, which is connected to the planetary gear 14 of the range gearbox device 6. The planetary gear 14 comprises three main components which are rotatable arranged in relation to each other, namely a sun gear 18, a planet carrier 20 and a ring gear 22. A number of planet gears 24 are rotatable arranged with bearings on the planet carrier 20. With knowledge of the number of teeth 32 of sun gear 18 and the ring gear 22, the relative gear ratio of the three components can be determined. The sun gear 18 is connected to the main shaft 26 of the main gearbox device 11 and the planet gears 24 engage the sun gear 18. The ring gear 22 surrounds and engages the planet gears 24. The main shaft 26 is preferably connected to a shaft 38 of the sun gear 18 by means of a splines connection 34, which has an axial extent and which allows an axial displacement between the main shaft 26 and the shaft 38 of the sun gear 18 when assembling and disassembling the range gearbox device 6 to and from the gearbox 2. The input shaft 16 is at its end provided with a sleeve 36, which internally cooperates with the circumference of a portion of the shaft 38 of the sun gear 18 by mean of the splines connection 34. Thus, the splines connection 34 is preferably designed such that the range gearbox device 6 can be assembled and disassembled in one piece to and from the rest of the gearbox 2. Thus, the maintenance costs are reduced, since the time required for the repair decreases.

A first axially displaceable coupling sleeve 42 is in a first gear position arranged to connect the range gearbox housing 13 with the ring gear 22 and in a second gear position arranged to disconnect the range gearbox housing 13 from the ring gear 22. The first axially displaceable coupling sleeve 42 is in the first gear position arranged to disconnect the shaft 38 of the sun gear 18 from the planet carrier 20. In the second position the first axially displaceable coupling sleeve 42 connects the shaft 38 of the sun gear 18 with the planet carrier 20.

A second axially displaceable coupling sleeve 43 is in a third gear position arranged to couple the ring gear 22 with an output shaft 28 of the gearbox 2. The output shaft 28 is coupled to the propeller shaft 10 of the vehicle 1. In the third gear position, corresponding to a reverse gear, the first axially displaceable coupling sleeve 42 is arranged to disconnect the shaft 38 of the sun gear 18 from the planet carrier 20 and instead is arranged to interconnect the planet carrier 20 with the range gearbox housing 13. In the first and second gear positions the second axially displaceable coupling sleeve 43 is arranged to interconnect the planet carrier 20 with the output shaft 28.

The first axially displaceable coupling sleeve 42 is on an inner and outer surface provided with first splines 50, which on the inner surface is arranged to interact with the corresponding first splines 50 arranged on the ring gear 22. The first splines 50 on the outer surface is arranged to interact on the inner periphery of a projection 52 which is fixedly connected to the range gearbox housing 13. The first splines 50 on the inner surface of the first axially displaceable coupling sleeve 42 are also arranged to cooperate with corresponding first splines 50 arranged on the input shaft 16. Corresponding first splines 50 disposed on the input shaft 16 are made on the periphery of a first sprocket 46 which is mounted on the shaft 38 of the sun gear 18. However, it is also possible to arrange the first sprocket 46 on the input shaft 16 instead of on the shaft 38 of the sun gear 18. Thus, the first sprocket 46 may be arranged on either side of the splines connection 34. The first splines 50 on the inner surface of the first axially displaceable coupling sleeve 42 are also arranged to cooperate with corresponding first splines 50 arranged on the planet carrier 20. Corresponding first splines 50 disposed on the planet carrier 20 are made on the periphery of a second sprocket 44 which is mounted on the planet carrier 20.

The second axially displaceable coupling sleeve 43 is on an inner surface provided with second splines 51 which are arranged to cooperate with corresponding second splines 51 arranged on the ring gear 22, the planet carrier 20 and the output shaft 28. The corresponding second splines 51 arranged on the planet carrier 20 are formed on the periphery of a third sprocket 49 which is mounted on the planet carrier 20. The corresponding second splines 51 provided on the output shaft 28 are formed on the periphery of a fourth sprocket 53 which is mounted on the output shaft 28.

An axial stop 54 arranged on the planet carrier 20 is adapted to abut against the ring gear 22, which axial stop 54 prevents the ring gear 22 to be moved axially. The axial stop 54 may consist of a disc-shaped plate, which by a first thrust bearing 56 is mounted on the planet carrier 20. The axial stop 54 is rotatable relative to the planet carrier 20 and the input shaft 16, and follows the rotation of the ring gear 22. The axial stop 54 fixates the ring gear 22 axially, and leads to that the axial bearing of the input shaft 16 in the gearbox 2 is subjected to less stress when the gears 18, 22, 24 are provided with helical teeth. However, instead of, or in combination with the axial stop 54 a pair of thrust bearings 55 may be arranged on both distal surfaces of the ring gear 22. Thus, the thrust bearings 55 are arranged between the ring gear and the planet carrier 20. A second thrust bearing 57 may be disposed between the shaft 38 of the sun gear 18 and the planet carrier 20 to accommodate axial forces generated in the sun gear 18.

The low gear in the gearbox 2 is obtained by displacing the first coupling sleeve 42 axially, so that the ring gear 22 is connected to the range gearbox housing 13.

The range gearbox device 6 according to the invention functions as follows when shifting from the first to the second gear position, that is, from the low range gear position to the high range gear position. In FIG. 2, the range gearbox device 6 is shifted into the low range gear position, which means that the first coupling sleeve 42 has been shifted to a position to connect the ring gear 22 with the range gearbox housing 13. Thus, when the range gearbox device 6 is in the low range gear position, a downshift takes place through the planetary gear 14. The shifting operation from the low range gear position to the high range gear position is made by disconnecting the first ring gear 22 from the range gearbox housing 13 by means of the first coupling sleeve 42 when the torque transmission between the ring gear 22 and range gearbox housing 13 ends, which is accomplished by disconnecting the internal combustion engine 4 from the main gearbox device 11 through disconnection of the clutch 5 and disconnect the planetary gear 14 from the output shaft 28 by means of axially displace the second coupling sleeve 43 to a neutral position. The axial displacement of the first coupling sleeve 42 is possible when the second coupling sleeve 43 is axially displaced to a neutral position, the planetary gear 14 is in a standstill condition and the first coupling sleeve 42 do not transmit any torque. In the high range gear position the first coupling sleeve 42 is displaced to a position where the first coupling sleeve 42 connects the planet carrier 20 to the first sprocket 46. When the range gearbox device 6 has been shifted into the high range gear position the clutch 5 is engaged and the planet carrier 20 is synchronized to the speed of the output shaft 28 before the second coupling sleeve 43 is displaced to a position for connecting the planet carrier 20 to the output shaft 28. Thus, the range gearbox device 6 operates in the high range gear position.

In order to shift gear to the low range gear position, the first coupling sleeve 42 is shifted by the first shift fork 60 in the right direction in FIG. 2 for releasing the planet carrier 20 from first sprocket 46 and thus from the input shaft 16. This is made possible when the torque transmission between the input shaft 16 and planet carrier 20 ends, which is accomplished by disconnecting the internal combustion engine 4 from the main gearbox device 11 by means of the clutch 5 and disconnect the planetary gear 14 from the output shaft 28 by means of axially displace the second coupling sleeve 43 to a neutral position. When the first coupling sleeve 42 no longer transmits any torque and the planetary gear 14 has been brought to a standstill position the axial displacement of the first coupling sleeve 42 is possible. The first coupling sleeve 42 is then shifted by the first shift fork 60 in the direction of the range gearbox housing 13 to thereby connect the ring gear 22 with the range gearbox housing 13. When the ring gear 22 is stationary, the first coupling sleeve 42 is displaced axially and interferes with the first splines 50 on the ring gear 22 and the range gearbox housing 13. Thus, in the low range gear position a downshift occurs through the range gearbox device 6. When the range gearbox device 6 has been shifted into the low range gear position, the clutch 5 is engaged and the planet carrier 20 is synchronized to the speed of the output shaft 28 before the second coupling sleeve 43 is displaced to a position for connecting the planet carrier 20 to the output shaft 28.

The second axially displaceable sleeve 43 is in the third gear position, i.e. in the reverse gear position arranged to connect the ring gear 22 with output shaft 28. Thus, the second coupling sleeve 43 is shifted by the second shift fork 61, so that the ring gear 22 is connected to the output shaft 28. The first coupling sleeve 42 is shifted by the first shift fork 60 to couple the planet carrier 20 with the range gearbox housing 13. The displacement of the respective coupling sleeve 42, 43 is performed when the input and the output shaft 16, 28 are stationary, which corresponds to a stationary operating state of the vehicle 1, or when the vehicle 1 travels backwards and the planetary gear 14 is disconnected from the output shaft 28 by means of the second coupling sleeve 43. The second coupling sleeve 43 may thereafter be displaced to connect the output shaft 28 with the second coupling sleeve 43 when the speed of the planetary gear 14 is synchronized to the speed of the output shaft 28 by means of the engine 4. In order to provide a stationary position of the input shaft 16 the clutch 5 of the vehicle 1 is transferred to a disconnected mode. When the range gearbox device 6 is operated in the third gear position, torque is transmitted from the input shaft 16 to the sun gear 18 and further to the planet gears 24 which transmits the torque to the ring gear 22 and further to the output shaft 28 via the second coupling sleeve 43. The planet carrier 20 is stationary as the first coupling sleeve 42 connects the planet carrier 20 with the range gearbox housing 13.

The gearbox 2 can also be brought to a fourth, parking position by displacing the first coupling sleeve 42 to a position where the planet carrier 20 is connected to the range gearbox housing 13 and when the second coupling sleeve 43 is shifted to a position where the planet carrier 20 is connected to the output shaft 28. Thus, the output shaft 28 is prevented to rotate while the input shaft 16 can rotate in a neutral position, because the input shaft 16 is not connected to the first coupling sleeve 42 in the parking position.

When the first coupling sleeve 42 is displaced from the right to left in FIG. 2 the first coupling sleeve 42 will shift the range gearbox device 6 from the low range gear position to the reverse gear position and further to the high range gear position.

The shift control arrangement 3 according to the invention comprises first and second power means 66, 67 which are provided for the axial displacement of the first and second coupling sleeves 42, 43. The first power means 66 is connected to a first shift fork 60, which is arranged in an outside circumferential groove 62 in the first coupling sleeve 42. The first power means 66 is connected to the first shift fork 60 by means of a first shift rod 68, which may be detachable from the first power means 66 by means of a first coupling element 69. The second power means 67 is connected to a second shift fork 61, which is arranged in an outside circumferential groove 62 in the second coupling sleeve 43. The second power means 67 is connected to the second shift fork 61 by means of a second shift rod 70, which may be detachable from the second power means 67 by means of a second coupling element 71. The first and second power means 66, 67 may be a pneumatic or hydraulic cylinder, or an electric actuator. The shift rods 68, 70 connected to the power means 66, 67 transfers the axial movement from the power means 66, 67 to the shift forks 60, 61. When assembling and disassembling the range gearbox device 6 to and from the main gearbox device 11 the shift rods 68, 70 are connected to and disconnected from the power means 66, 67. The shift rods 68, 70 and power means 66, 67 are schematically shown on top of the main gearbox housing 12 and on the range gearbox housing 13 in FIG. 2.

A first end part 72 of the first shift rod 68 is connectable to the first power means 66 by means of the first coupling element 69. A first end part 73 of the second shift rod 70 is connectable to the second power means 67 by means of the second coupling element 71. Such first and second coupling elements 69, 71 make it possible to connect and remove the shifting rods 68, 70 from the power means 66, 67 when assembling and disassembling the gearbox 2 in the vehicle.

In order to prevent damage in the range gearbox device 6 due to selecting an impropriate gear when shifting gears in the range gearbox device 6 the shift control arrangement according to the invention is provided with a shift interlock 74. Such an impropriate selection of gears may be the selection of the low range gear when the range gearbox device 6 is shifted into the reverse gear. A malfunction in a control system of the gearbox 2 may unintentional be activating the power means 66, 67 and move one of the first and second axially displaceable coupling sleeves 42, 43. As a result the gear wheels in the range gearbox device 6 and also the coupling sleeves 42, 43 could be damaged.

The shift interlock 74 comprises a lock pin 75 which is preferably arranged at the main gearbox housing 12, which at least partly surrounds the main gearbox device 11. When arranging the lock pin 75 at the main gearbox housing 12, the axial extension of a range gearbox device 6 arranged on the main gearbox device 11 can be reduced. The range gearbox device 6 can therefore be designed with a short axial extension which reduces the weight of the range gearbox device 6. Thus, assembling and disassembling the range gearbox device 6 in the vehicle will be easy.

Figure 3:
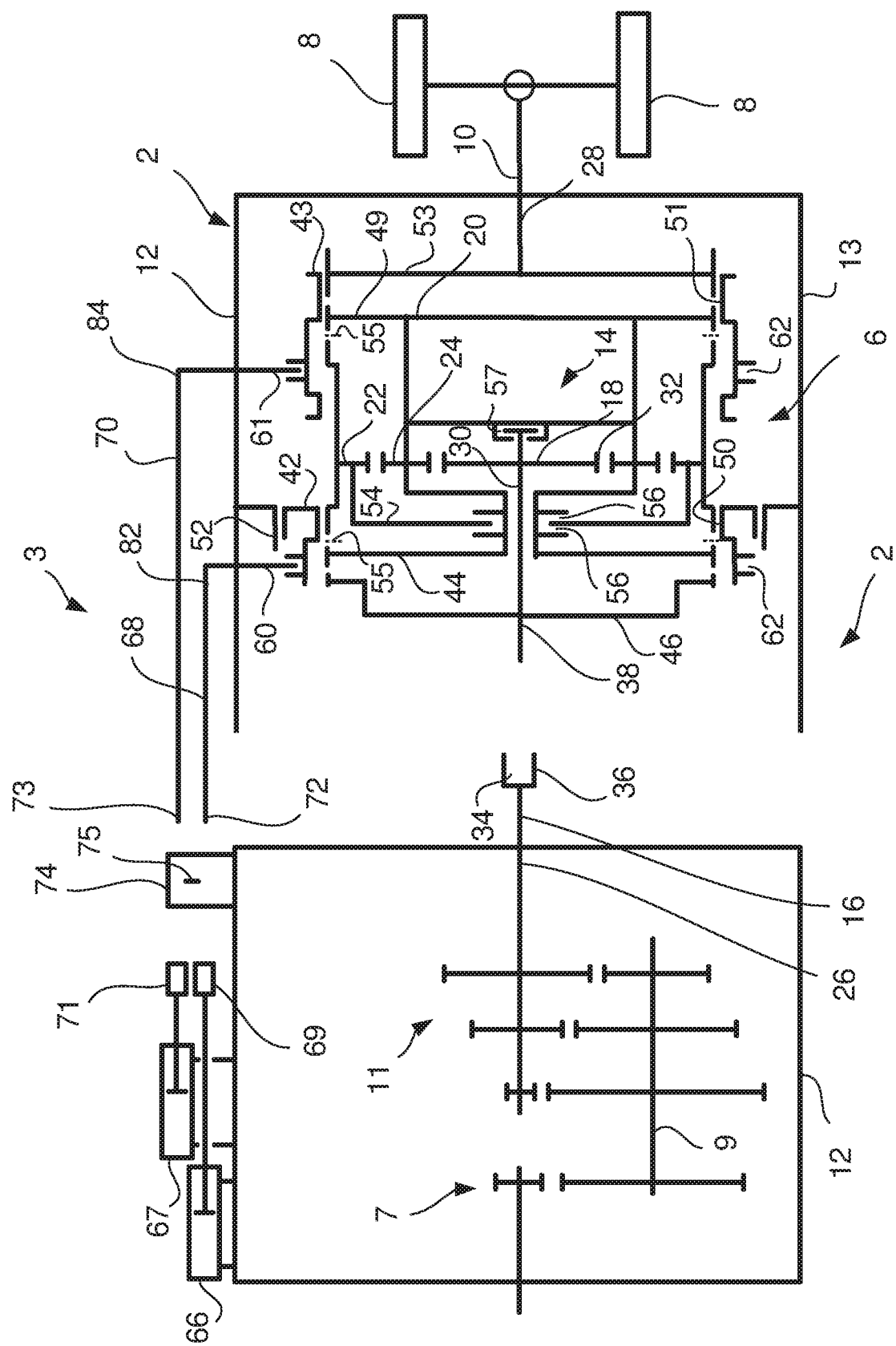
FIG. 3 shows schematically a cross section of the gearbox in FIG. 2 in a disassembled condition.

FIG. 3 shows schematically a cross section of the gearbox in FIG. 2 in a disassembled condition. The first and second shift rods 68, 70 have been disconnected from the first and second coupling element 69, 70, and the range gearbox device 6 has been disassembled from the main gearbox device 11. The main shaft 26 has also been disconnected from the shaft 38 of the sun gear 18 by means of the splines connection 34. Preferably, the propeller shaft 10 has been disconnected from the output shaft 28 of the range gearbox device 6 before the range gearbox device 6 is disassembled from the main gearbox device 11. Thus, the range gearbox device 6 has been disassembled in one piece from the rest of the main gearbox device 11, which will reduce the maintenance costs since the time required for the repair decreases.

Figure 4A:
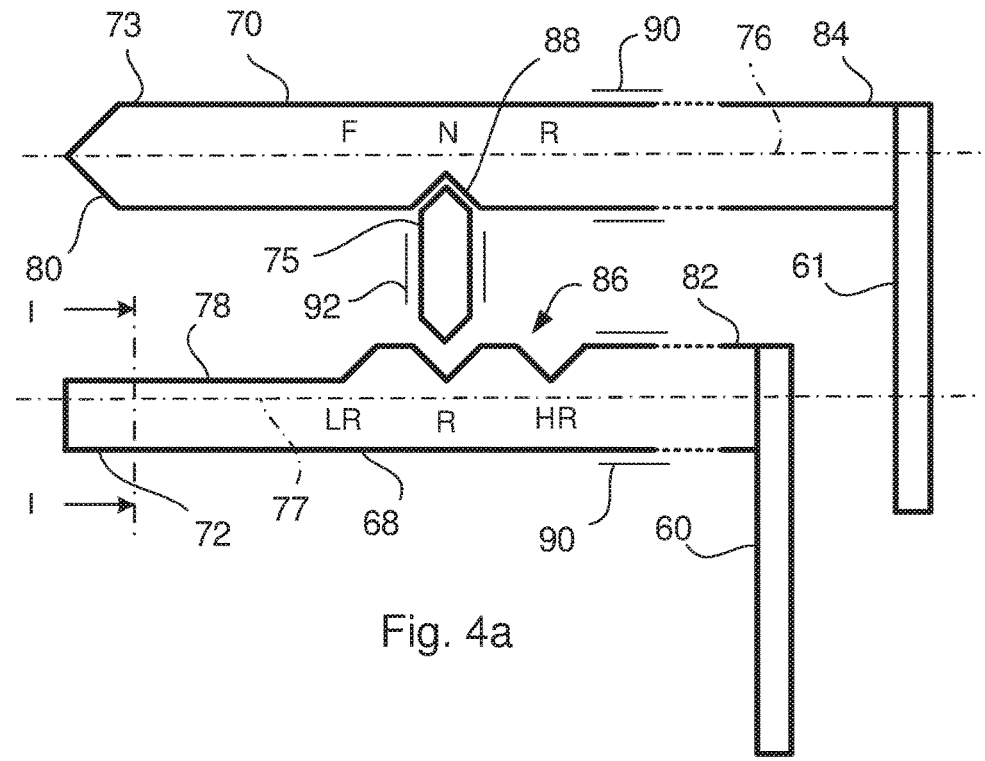
FIG. 4a shows schematically a shift control arrangement according to the invention in a neutral position.

FIG. 4*a* shows schematically a shift control arrangement 3 according to the invention in a neutral position. The first end part 72 of the first shift rod 68 is provided with an axial directed cut out 78 for non-conflicting with the lock pin 75, and the first end part 73 of the second shift rod 70 is provided with a control surface 80 for axial movement of the lock pin 75.

The control surface 80 and the axial directed cut out 78 make it easy to assemble and disassemble the gearbox 2 in a vehicle 1, because the shift rods 68, 70 may be assembled to the power means 66, 67 after a main gearbox device 11 first has been mounted to the vehicle 1. Also, instead of removing the complete gearbox 2 from the vehicle 1 only the range gearbox device 6 can be disassembled from the vehicle 1. When moving the shifting rods 68, 70 in an axial direction during assembling and disassembling the gearbox 2 the lock pin 75 will allow this movement due to the control surface 80 and the axial directed cut out 78.

A second end part 82 of the first shift rod 68 is connected to the first shift fork 60 and a second end part 84 of the second shift rod 70, is connected to the second shift fork 61. A first set of grooves 86 is arranged in the first shift rod 68 and a second groove 88 is arranged in the second shift rod 70, and the lock pin 75 arranged between the first and second shift rod 68, 70, which lock pin 75 together with the first set of grooves 86 and the second groove 88 are arranged to restrict or allow axial movement of the respective first and second shift rod 68, 70.

Preferably, the lock pin 75 has a pointed shape in both ends, which will make it possible for the shift rods 68, 70 to move the lock pin 75 axially in the main gearbox housing 12 when shifting gears in the gearbox 2. The first set of grooves 86 together with the lock pin 75 are arranged to prevent the first shift rod 68 to move axially and to allow the second shift rod 70 to move axially. The second groove 88 together with the lock pin 75 is arranged to prevent the second shift rod 70 to move axially and to allow the first shift rod 68 to move axially. When the lock pin 75 is arranged within a groove in the first set of grooves 86 the second shift rod 70 is allowed to move axially and the first shift rod 68 is restricted to move. When the lock pin 75 is arranged within the second groove 88 in the first shift rod 68 is allowed to move axially and the second shift rod 70 is restricted to move.

In FIG. 4*a* the second shift rod 70 has been moved to a neutral position and the lock pin 75 is free to move into the second groove 88 of the second shift rod 70 when the second shift rod 70 is moved into the neutral position. The first shift rod 68 has been moved into the reverse gear position. However, since the lock pin 75 is moved into the second groove 88 for neutral position of the second shift rod 70 the first shift rod 68 is free to move in its axial direction.

Figure 4B:
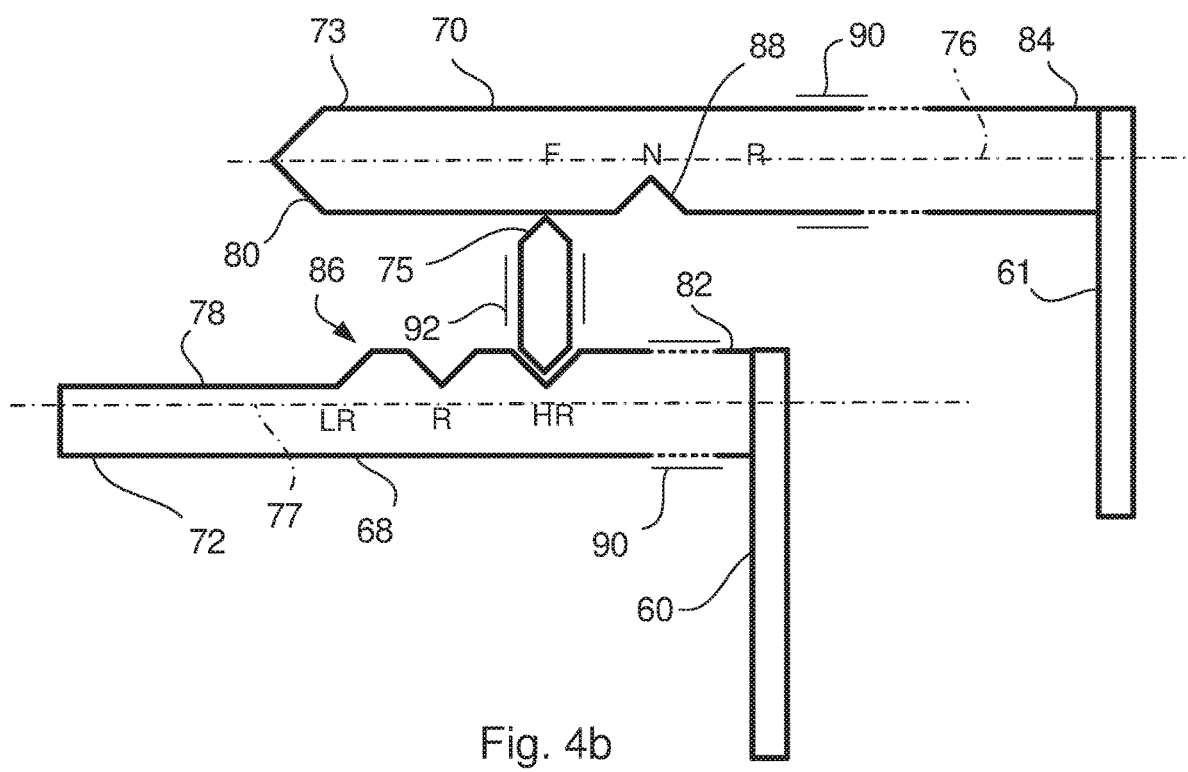
FIG. 4b shows schematically the shift control arrangement according to the invention in a forward, high range position.

FIG. 4*b* shows schematically the shift control arrangement 3 according to the invention in a forward, high range position. As an example, when the first shift rod 68 is in a position corresponding to a high range gear in the range gearbox device 6, the lock pin 75 has been moved into a groove HR in the first set of grooves 86 of the high range gear position in the first shift rod 68. As a result, the first shift rod 68 is restricted to move axially and therefore the first shift rod 68 may not unintentionally be moved to the reverse gear position, which would lead to a failure in the range gearbox device 6.

Figure 4C:
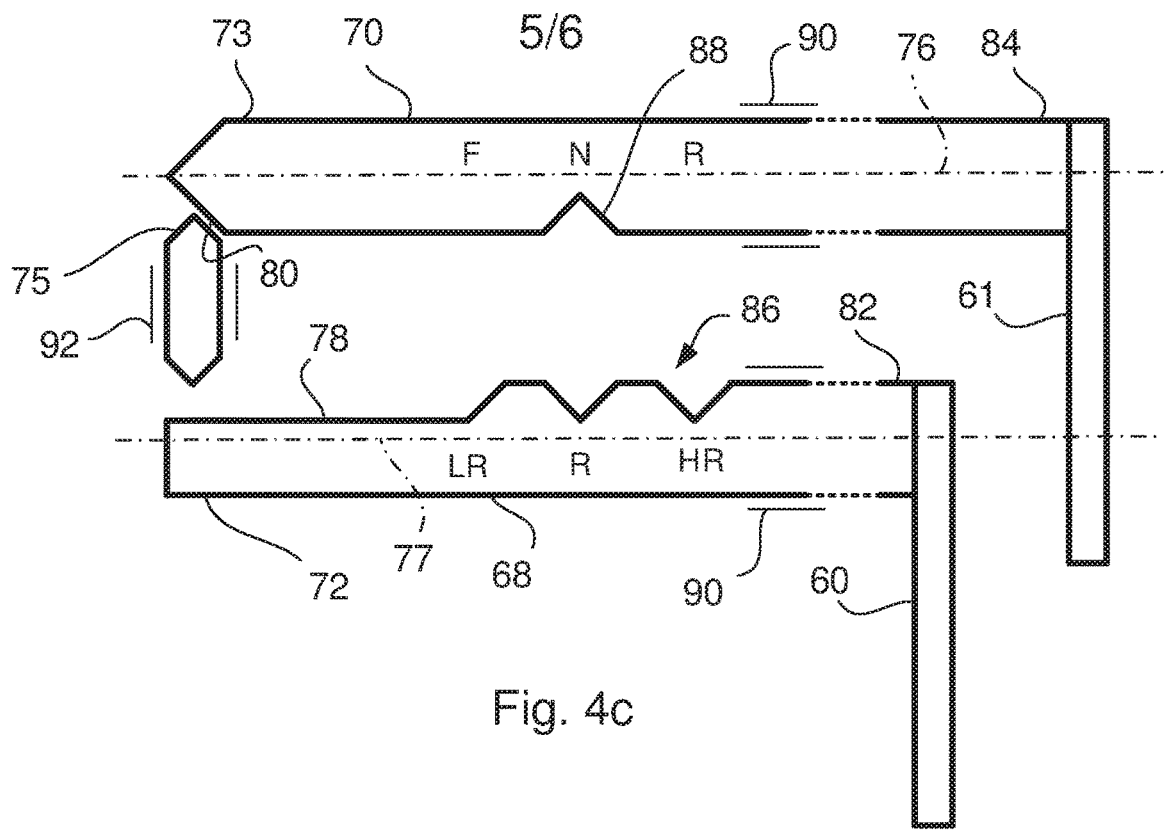
FIG. 4c shows schematically the shift control arrangement according to the invention in a first pre-assembled position.

FIG. 4*c* shows schematically the shift control arrangement according to the invention in a first pre-assembled position. When assembling the range gearbox device 6 to the main gearbox device 11 the first and second shift rods 68, 70 are already mounted on the range gearbox device 6. The lock pin 75 has been mounted on the main gearbox device 11 before the main gearbox device 11 was mounted to the vehicle. Because the shift control arrangement 3 is situated on top of the range gearbox device 6 to the main gearbox device 11 the lock pin 75 will not be easy to remove before the range gearbox device 6 is assembled to the main gearbox device 11. Since the first end part 73 of the second shift rod 70 is provided with a control surface 80 for axial movement of the lock pin 75, and the first end part 72 of the first shift rod 68 is provided with an axial directed cut out 78 for non-conflicting with the lock pin 75 it will be easy to assemble the range gearbox device 6 in the vehicle 1 even though the main gearbox device 11 is already mounted in the vehicle 1.

Figure 4D:
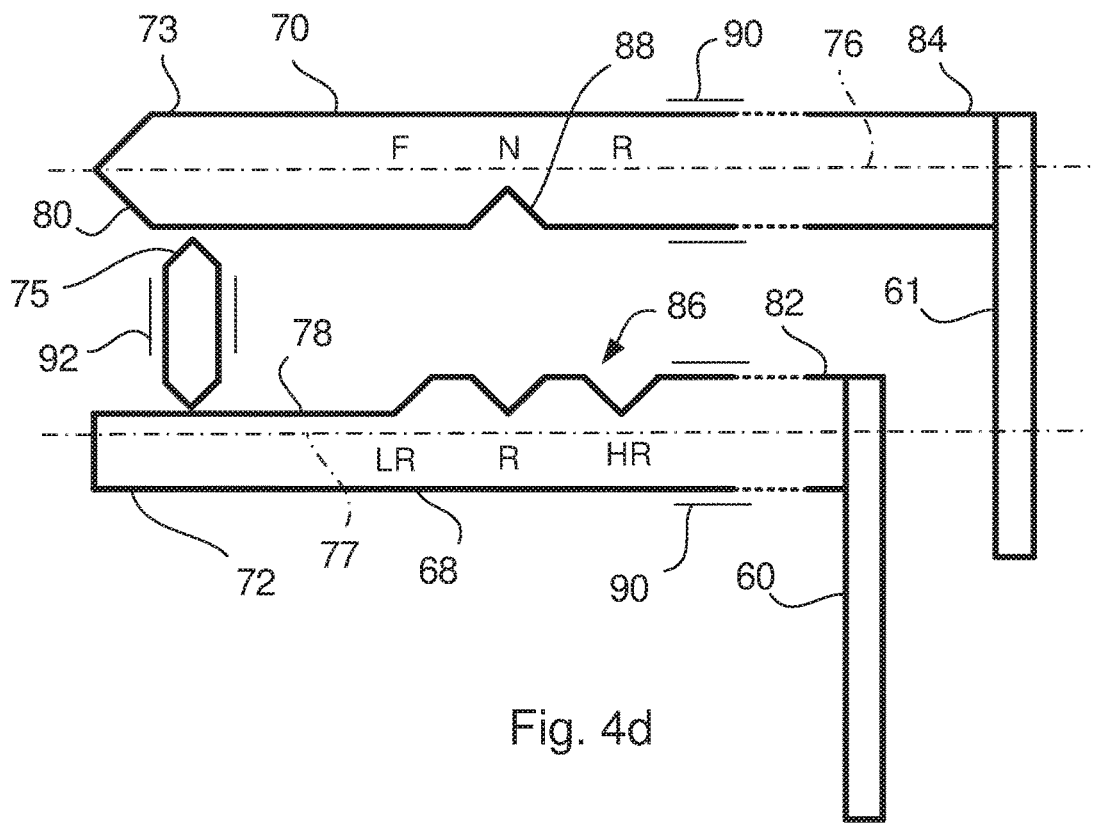
FIG. 4d shows schematically the shift control arrangement according to the invention in a second pre-assembled position.
Figure 5A:
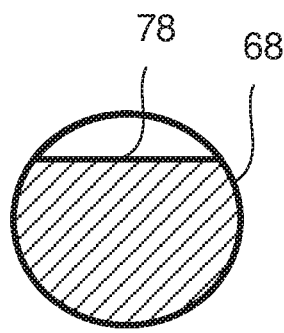
Figure 5B:
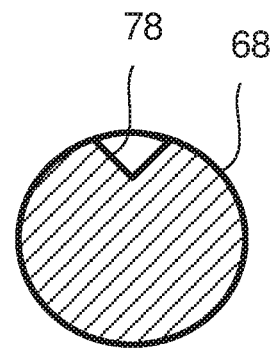
Figure 6A:
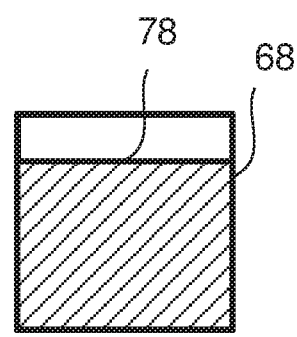
Figure 6B:
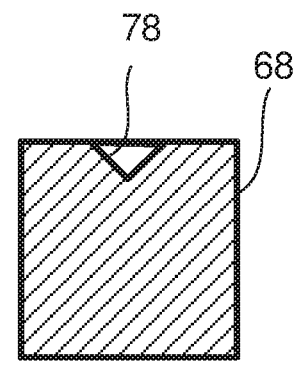

During the assembling of the range gearbox device 6 in the vehicle the first and second shift rods 68, 70 are pushed axially through guide bores 90 in the main gearbox housing 12. When the second shift rod 70 reaches the lock pin 75, the control surface 80 of the first end part 73 of the second shift rod 70 is urges the lock pin 75 to move axially in a guide hole 92 in the main gearbox housing 12. The lock pin 75 moves axially in the direction of the first shift rod 68 which is provided with the axial directed cut out 78 on the first end part 72 of the first shift rod 68. In FIG. 4*d* the shift control arrangement 3 according to the invention is schematically shown in a second pre-assembled position, where the lock pin 75 has been moved axially in the direction of the first shift rod 68 and has reached the axial directed cut out 78 on the first end part 72 of the first shift rod 68. Since the axial directed cut out 78 is non-conflicting with the lock pin 75 both the first and second shift rods 68, 70 are free to move axially in direction to the first and second power means 66, 67 in order to be connected to the first and second connection elements 69, 71.

The disassembling of the range gearbox device 6 from the main gearbox device 11 takes place in the opposite direction.

Preferably, the control surface 80 of the first end part 73 of the second shift rod 70 has an angle between 10°-80°, and preferably between 30°-60°, in relation to a central axis 76 of the second shift rod 70. Such a control surface 80 will move the lock pin 75 axially when the second shift rod 70 is moved axially and the control surface 80 is in contact with the lock pin 75.

FIGS. 5*a*-6*b* show schematically different embodiments of a cross section trough line I-I of the first shift rod 68 in FIG. 4*a*. According to the embodiment of the invention shown in FIG. 5*a*, the axial directed cut out 78 of the first end part 72 of the first shift rod 68 is essentially flat. This makes it possible to move the first shift rod 68 axially and past the lock pin 75 when assembling and disassembling the gearbox 2 in the vehicle 1. According to a further embodiment of the invention shown in FIG. 5*b* the axial directed cut out 78 of the first end part 72 of the first shift rod 68 has a shape in a cross section to a central axis 77 that is complementary to the shape of the lock pin 75. Thus, the lock pin 75 will allow the first shift rod 68 to move axially when the lock pin 75 is arranged into the axial directed cut out 78. The axial directed cut out 78 has according to this embodiment a substantially V-shape in cross section. The first shift rod 68 may have a substantially circular cross section, which is disclosed in FIGS. 5*a* and 5*b*. However, the first shift rod 68 may also have another shaped cross section, which may for example be substantially square shaped, which is disclosed in FIGS. 6*a* and 6*b*. Preferably, the second shift rod 70 has a similar cross section as the first shift rod 68.

The components and features specified above may within the framework of the invention be combined between the different embodiments specified.

The invention claimed is:

1. A shift control arrangement in a gearbox, comprising:
 a first shift rod, provided with a first and second end part, which first end part is connectable to a first power means and the second end part is connected to a first shift fork;
 a second shift rod, provided with a first and second end part, which first end part is connectable to a second power means and the second end part is connected to a second shift fork;
 a first set of grooves arranged in the first shift rod;
 a second groove arranged in the second shift rod; and
 a lock pin arranged between the first and second shift rod, which lock pin together with the first set of grooves and the second groove are arranged to restrict and/or allow axial movement of the respective first and second shift rods,
 wherein the first end part of the first shift rod is provided with an axial directed cut out for non-conflicting with the lock pin, and
 wherein in that the first end part of the second shift rod is provided with a control surface for axial movement of the lock pin.

2. A shift control arrangement according to claim 1, wherein the axial directed cut out of the first end part of the first shift rod is essentially flat.

3. A shift control arrangement according to claim 1, wherein the axial directed cut out of the first end part of the first shift rod has a shape in a cross section to a central axis that is complementary to the shape of the ends of the lock pin.

4. A shift control arrangement according to claim 3, wherein the lock pin has a pointed shape in both ends.

5. A shift control arrangement according to claim 1, wherein a plane normal to the control surface of the first end part of the second shift rod has an angle between 10°-80° in relation to a central axis of the second shift rod.

6. A shift control arrangement according to claim 1, wherein the first end part of the first shift rod is connectable to the first power means by means of a first coupling element; and the first end part of the second shift rod is connectable to the second power means by means of a second coupling element.

7. A shift control arrangement according to claim 1, wherein the lock pin is arranged at a main gearbox housing, which at least partly surrounds the main gearbox device.

8. A shift control arrangement according to claim 7, wherein the first and second shift forks are arranged in a range gearbox device, which is connectable to the main gearbox device.

9. A shift control arrangement according to claim 1, wherein the first set of grooves together with the lock pin are arranged to prevent the first shift rod from moving axially and to allow the second shift rod to move axially, and wherein the second groove together with the lock pin is arranged to prevent the second shift rod from moving axially and to allow the first shift rod to move axially.

10. A shift control arrangement according to claim 1, wherein a plane normal to the control surface of the first end part of the second shift rod has an angle between 30°-60° in relation to a central axis of the second shift rod.

11. A gearbox comprising a shift control arrangement, comprising:

a first shift rod, provided with a first and second end part, which first end part is connectable to a first power means and the second end part is connected to a first shift fork;

a second shift rod, provided with a first and second end part, which first end part is connectable to a second power means and the second end part is connected to a second shift fork;

a first set of grooves arranged in the first shift rod;

a second groove arranged in the second shift rod; and a lock pin arranged between the first and second shift rod, which lock pin together with the first set of grooves and the second groove are arranged to restrict and/or allow axial movement of the respective first and second shift rods, wherein the first end part of the first shift rod is provided with an axial directed cut out for non-conflicting with the lock pin, and wherein the first end part of the second shift rod is provided with a control surface for axial movement of the lock pin.

12. A shift control arrangement according to claim 11, wherein the axial directed cut out of the first end part of the first shift rod is essentially flat.

13. A shift control arrangement according to claim 11, wherein the axial directed cut out of the first end part of the first shift rod has a shape in a cross section to a central axis that is complementary to the shape of the ends of the lock pin.

14. A shift control arrangement according to claim 13, wherein the lock pin has a pointed shape in both ends.

15. A shift control arrangement according to claim 11, wherein a plane normal to the control surface of the first end part of the second shift rod has an angle between 10°-80° in relation to a central axis of the second shift rod.

16. A vehicle comprising a gearbox having a shift control arrangement, comprising:

a first shift rod, provided with a first and second end part, which first end part is connectable to a first power means and the second end part is connected to a first shift fork;

a second shift rod, provided with a first and second end part, which first end part is connectable to a second power means and the second end part is connected to a second shift fork;

a first set of grooves arranged in the first shift rod;

a second groove arranged in the second shift rod; and a lock pin arranged between the first and second shift rod, which lock pin together with the first set of grooves and the second groove are arranged to restrict and/or allow axial movement of the respective first and second shift rods, wherein the first end part of the first shift rod is provided with an axial directed cut out for non-conflicting with the lock pin, and wherein the first end part of the second shift rod is provided with a control surface for axial movement of the lock pin.

17. A shift control arrangement according to claim 16, wherein the axial directed cut out of the first end part of the first shift rod is essentially flat.

18. A shift control arrangement according to claim 16, wherein the axial directed cut out of the first end part of the first shift rod has a shape in a cross section to a central axis that is complementary to the shape of the ends of the lock pin.

19. A shift control arrangement according to claim 18, wherein the lock pin has a pointed shape in both ends.

20. A shift control arrangement according to claim 16, wherein a plane normal to the control surface of the first end part of the second shift rod has an angle between 10°-80° in relation to a central axis of the second shift rod.

* * * * *